(12) United States Patent
Zhang et al.

(10) Patent No.: US 10,949,860 B2
(45) Date of Patent: Mar. 16, 2021

(54) SYSTEMS AND METHODS FOR PROCESSING SUPPORT MESSAGES RELATING TO SERVICES ASSOCIATED WITH PAYMENT SYSTEMS

(71) Applicant: MASTERCARD INTERNATIONAL INCORPORATED, Purchase, NY (US)

(72) Inventors: Xiaoying Zhang, Ithaca, NY (US); Ravi Santosh Arvapally, O'Fallon, MO (US); Hasan Hicsasmaz, Iowa City, IA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 844 days.

(21) Appl. No.: 15/353,517

(22) Filed: Nov. 16, 2016

(65) Prior Publication Data
US 2018/0137516 A1    May 17, 2018

(51) Int. Cl.
| | |
|---|---|
| *G06Q 10/06* | (2012.01) |
| *G06Q 30/00* | (2012.01) |
| *G06N 20/00* | (2019.01) |
| *G06Q 20/08* | (2012.01) |

(52) U.S. Cl.
CPC .......... *G06Q 30/016* (2013.01); *G06N 20/00* (2019.01); *G06Q 10/06311* (2013.01); *G06Q 20/08* (2013.01)

(58) Field of Classification Search
CPC ...... G06Q 30/016; G06Q 10/06; G06Q 10/10; G06Q 10/06311; G06Q 10/063114; G06Q 30/02

USPC ....... 705/36 R, 4, 7.13, 40, 7.15, 7.21, 7.22; 340/3.1

See application file for complete search history.

(56) References Cited

U.S. PATENT DOCUMENTS

| | | | |
|---|---|---|---|
| 7,568,001 B2 * | 7/2009 | McPartlan | .......... H04M 3/5235 709/202 |
| 7,607,046 B1 * | 10/2009 | Bruckhaus | ............ G06F 11/008 702/185 |

(Continued)

OTHER PUBLICATIONS

Awad, W. A., and S. M. Elseuofi. "Machine Learning methods for E-mail Classification." International Journal of Computer Applications 16.1 (2011): 39-45. (Year: 2011).*

*Primary Examiner* — Kelly S. Campen
(74) *Attorney, Agent, or Firm* — Harness, Dickey & Pierce, P.L.C.

(57) ABSTRACT

Systems and methods are provided for scoring support messages from users indicative of the likelihood of escalation of the messages, upon which the messages may be prioritized. One exemplary method includes receiving, from a user, a support message related to a payment service provider and generating an escalation score for the support message based on a temporal factor associated with a duration associated with the support message, a source factor for the support message, and a text content factor of the support message. The exemplary method further includes identifying a likelihood of escalation of the support message based on the escalation score, whereby a support representative assigned to the support message is able to prioritize the support message over at least one other support message based on the likelihood of escalation for the support message.

9 Claims, 4 Drawing Sheets

(56) References Cited

U.S. PATENT DOCUMENTS

| | | | | |
|---|---|---|---|---|
| 7,609,821 B2* | 10/2009 | Delaney | ............... | G06Q 10/107 |
| | | | | 379/88.11 |
| 7,735,127 B1* | 6/2010 | Rive | ................. | H04L 63/0209 |
| | | | | 726/12 |
| 7,844,546 B2* | 11/2010 | Fleishman | ............. | G06Q 20/40 |
| | | | | 705/39 |
| 10,117,617 B2* | 11/2018 | Cantu | ................... | A61B 5/0064 |
| 10,380,595 B2* | 8/2019 | Karnati | ............. | G06Q 30/0281 |
| 2004/0148252 A1* | 7/2004 | Fleishman | ............. | G06Q 20/40 |
| | | | | 705/39 |
| 2006/0010217 A1 | 1/2006 | Sood | | |
| 2006/0015450 A1* | 1/2006 | Guck | .................... | G06Q 20/10 |
| | | | | 705/39 |
| 2010/0169148 A1* | 7/2010 | Oberhofer | ........ | G06Q 10/06311 |
| | | | | 705/7.13 |
| 2011/0125644 A1* | 5/2011 | Fleishman | ............. | G06Q 20/40 |
| | | | | 705/44 |
| 2013/0262320 A1 | 10/2013 | Makanawala et al. | | |
| 2015/0278816 A1* | 10/2015 | Fleishman | ............. | G06Q 20/40 |
| | | | | 705/44 |
| 2016/0100790 A1* | 4/2016 | Cantu | ................. | A61B 5/0064 |
| | | | | 600/306 |
| 2016/0261747 A1 | 9/2016 | Thirugnanasundaram et al. | | |
| 2016/0269255 A1 | 9/2016 | Embree et al. | | |
| 2017/0193506 A1* | 7/2017 | Karnati | ............. | G06Q 20/3224 |

\* cited by examiner

From: John Smith
Bank 108

Date: March 1 at 10:37 AM

402 — Subject: A-B-C Payment Application

404 —
Dear Payment Service Provider:

This email is regarding your A-B-C payment application. We would like to offer your A-B-C payment application to our consumers. We would like to offer this app within the loyalty program. We plan to offer this as part of our year 9999 Q2 loyalty gifts to all of our Payment Service Provider consumers.

I'm expecting two pieces of information at this point:
a. Documentation on how A-B-C payment application works, and its benefits.
b. On-boarding documentation.

Waiting to hear back from you.

Thanks Much,

John Smith
Bank 108

FIG. 4

SYSTEMS AND METHODS FOR PROCESSING SUPPORT MESSAGES RELATING TO SERVICES ASSOCIATED WITH PAYMENT SYSTEMS

FIELD

The present disclosure generally relates to systems and methods for processing support messages from users relating to services associated with payment systems, and in particular, to systems and methods for scoring the support messages based on various factors indicative of likelihood of the support messages being escalated, for example, to heightened review.

BACKGROUND

This section provides background information related to the present disclosure which is not necessarily prior art.

Payment accounts are known for supporting transactions for goods and services (broadly, products) by consumers at merchants. Often, the transactions involve, or invoke, services associated with payment service providers and/or related applications configured to process the transactions, where the benefits of the services are realized by different entities involved in the transactions. When the services are not functioning properly, or are perceived as not functioning properly, or are misused and/or mishandled by the entities, for example, users associated with the entities (e.g., representatives of the entities, etc.) are known to submit support messages (e.g., emails, etc.) to the payment service providers identifying the issues. And, in response to the support messages, the payment service providers (or other associated entities) seek to resolve the issues. In doing so, the support messages may be subject to different levels of review, by support personnel at the payment service providers, based on complexity of the issues raised in the support messages. The support personnel then respond, as appropriate, in due course, with resolutions to the issues.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When issues arise in payment systems, such as with services provided by the payment systems and/or with applications associated with the payment systems, for example, users (e.g., users of the payment system such as consumers, customers, employees or representatives associated with merchants, payment service providers, issuers, etc. in the systems; etc.) send support messages seeking help in resolving the issues. Depending on the scope of the payment systems, number of services provided thereby, and/or number of associated users, etc., a volume of such support messages may be substantial, for example, hundreds, or thousands per day, etc. Generally, after receipt, the support messages are addressed by support personnel in due course, sometimes after being escalated for review based on, for example, user requests, complexity of the issues raised, and/or pendency of the support messages.

Uniquely, the systems and methods herein can be used to predict likelihood of escalation of such support messages, whereby the support messages with a higher likelihood of being escalated may be addressed more promptly (e.g., in advance of other support messages, etc.). In particular, in response to a support message from a user, a support engine determines a score for the support message based on a temporal factor (e.g., a time since the support message was received, etc.), a source factor (e.g., an identity of the entity submitting the support message or the entity associated with the user submitting the support message, etc.), and a text content factor of the support message, with the score then being indicative of a likelihood of the message being escalated for review. In turn, based on the score, the support message may be prioritized, or de-prioritized, for handling by support personnel, thereby permitting the support message to receive the appropriate attention (e.g., prior to potentially being subject to heightened review, etc.). In this manner, user satisfaction may be improved in connection with addressing issues raised in support messages, at least in some instances, by focusing support personnel more immediately on support messages likely to be escalated and/or by reducing an overall number of the support messages ultimately escalated for review.

Figure 1:
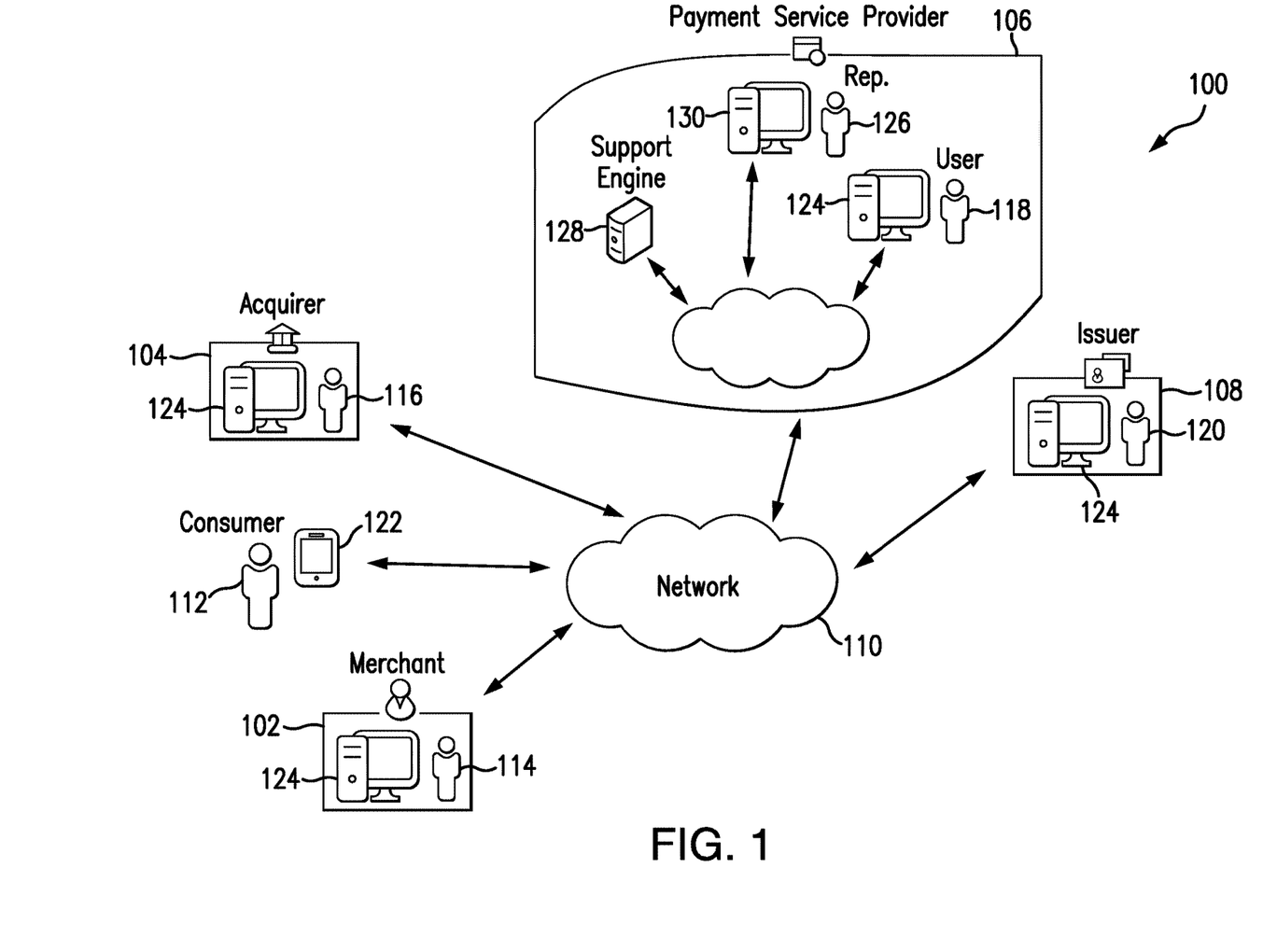
FIG. 1 is a block diagram of an exemplary payment system including one or more aspects of the present disclosure.

FIG. 1 illustrates an exemplary payment system 100, in which the one or more aspects of the present disclosure may be implemented. Although components of the payment system 100 are presented in one arrangement, other embodiments may include the same or different components arranged otherwise, depending, for example, on processing of payment account transactions, services offered in the payment system 100, etc. Moreover, while the various aspects of the disclosure are described herein as implemented in the payment system 100, it should be appreciated that the disclosure is not limited to the payment system 100 and that the aspects described herein may be implemented in systems other than payment systems, and/or in systems and/or entities unrelated to payment account transactions, etc.

The illustrated payment system 100 generally includes a merchant 102, an acquirer 104 associated with the merchant 102, a payment service provider 106, and an issuer 108 configured to issue payment accounts to consumers, each coupled to (and in communication with) network 110. The network 110 may include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts of the system 100, or even combinations thereof. In one example, the network 110 includes multiple different networks, where different ones of the multiple networks are accessible to different ones of the illustrated components in FIG. 1. In particular, for example, the network 110 may include a private payment transaction network made accessible by the payment service provider 106 to the acquirer 104 and the issuer 108 and, separately, the public Internet, which is accessible as desired by the merchant 102, the acquirer 104, other parts of the system 100, etc.

The merchant 102 in the payment system 100 is configured to offer products (e.g., goods and/or services, etc.) for sale to consumers, including consumer 112 (broadly, a user). And, the consumer 112 is associated with a payment account issued to the consumer 112 by the issuer 108, for use in funding transactions with the merchant 102, for example. In connection therewith, the acquirer 104, the payment service provider 106, and the issuer 108 are configured to cooperate, in response to a request from the consumer 112 to purchase a product at the merchant 102, to facilitate the purchase request to the consumer's payment account (for funding the purchase).

Specifically, for example, when the consumer 112 desires to purchase a product from the merchant 102 (and fund the purchase with his/her payment account), the consumer 112 initiates the transaction by presenting a payment device (e.g., a credit card, a debit card, a smartphone enabled with a virtual wallet application, etc.) to the merchant 102 (whether in-person, or virtually via the network 110). In turn, the merchant 102 reads the payment device and communicates an authorization request for the transaction to the acquirer 104. The authorization request may include, for example, payment account information for the consumer's payment account, an amount of the transaction, and/or other information relating thereto necessary to identify the consumer's payment account and determine whether sufficient credit exists at the consumer's payment account to complete the transaction. The acquirer 104, then, communicates the authorization request to the issuer 108, through the payment service provider 106 (e.g., through MasterCard®, VISA®, Discover®, or American Express® service providers, etc.) to actually determine whether the payment account is in good standing and whether there is sufficient credit or funds to complete the purchase. If the issuer 108 accepts/approves the transaction, an authorization reply is provided back to the acquirer 104 and the merchant 102, thereby permitting the merchant 102 to continue with the transaction. The transaction is later cleared and/or settled by and between the merchant 102 and the acquirer 104, and by and between the acquirer 104 and the issuer 108 (via appropriate agreements). If the issuer 108 declines the transaction, however, an authorization reply (indicating the decline) is provided back to the merchant 102, thereby permitting the merchant to stop the transaction (or seek alternate funding).

Consistent with the above example, each payment account transaction performed in the payment system 100, and its communication through the merchant 102, the acquirer 104, the payment service provider 106, and the issuer 108, whether approved or not, involves one or more services of the system 100 and, potentially, applications associated therewith (e.g., as provided by the payment service provider 106 or other parts of the system 100, etc.). Such services may include, without limitation, authorization of transactions, clearing and/or settlement of transactions, fraud detection, data analysis, data access, virtual wallet services, chargebacks, data reporting, and various other services, etc. With that said, it should be appreciated that the services listed herein are exemplary in nature, and are provided for purposes of illustration only, and that other services, whether specific to payment service providers or not, may be involved in other embodiments of the present disclosure and be equally applicable to the systems and methods herein.

With continued reference to FIG. 1, each of the merchant 102, the acquirer 104, the payment service provider 106, and the issuer 108 in the payment system 100 is associated with a respective one of users 114-120. The users 114-120 may include, for example, employees, managers, etc. of the respective part of the system 100. In connection therewith, and depending on the types of services involved in the payment system 100, for example, one or more of the users 114-120 may be configured to manage and/or facilitate the services, on behalf of the respective entities, in connection with processing the various payment account transactions through their respective part of the payment system 100. While four users 114-120 are illustrated in FIG. 1 (associated with the merchant 102, the acquirer 104, the payment service provider 106, and the issuer 108, respectively), it should be appreciated that any number of users may be present in other system embodiments (in any desired association with the various parts of the system 100, or other parts not shown). In addition, while only one merchant 102, one acquirer 104, one payment service provider 106, and one issuer 108 are shown, a different number of such parts of the system 100 may also be included in other embodiments.

In addition in the payment system 100, the consumer 112 is associated with a computing device 122, and similarly, each of the users 114-120 is associated with a computing device 124. Each of the computing devices 122 and 124 may include, for example, a smartphone, a tablet, a workstation, a laptop, a personal computer, or any other type of computing device as described herein, etc. In the system 100, for example, the computing device 122 is illustrated as a smartphone and the computing devices 124 are each illustrated as workstations (although this is not required in all embodiments). In connection therewith, the consumer 112 and the users 114-120 are able to utilize their computing devices 122 and 124, respectively, to submit one or more support messages to the payment service provider 106, for example (or any other part of the system 100), regarding issues encountered with one or more of the services and/or related applications being implemented in the system 100 for a given payment account transaction, or, more generally, regarding any interactions in the system 100, etc.

Further in the payment system 100, the payment service provider 106 includes a representative 126 (broadly, a support personnel member or a customer-care personnel member), who is employed by the payment service provider 106 to review and respond to the support messages. The representative 126 is associated with a computing device 130, which is used by the representative 126 to view a queue of support messages in need of responses and also to respond to those support messages. While a single representative 126 and a single computing device 130 is illustrated in FIG. 1, it should be appreciated that the payment system 100 (including the payment service provider 106) may include multiple representatives and/or multiple associated computing devices within the scope of the present disclosure.

In particular in the payment system 100, as a support message is included in the queue for a predefined duration, or at the request of the submitting one of the consumer 112 and/or users 114-120, or at the request of the representative 126, the support message may be escalated for review, either by the representative 126 or by other support personnel within the payment service provider 106. For example, in connection with a support message transmitted to the representative 126 by the user 116 (in association with an issue encountered at the acquirer 104), the user 116 may escalate (e.g., request the representative to escalate, etc.) the support message if a response is not received in a timely fashion, or if inaccurate solutions/answers are provided to the issue raised in the support message. The escalation of the support message, in the payment service provider 106, is then often tracked and/or recorded as a mechanism to define the performance and/or effectiveness of the representative 126, a group including the representative 126, and/or the payment service provider 106 (or other divisions or parts thereof) in general, or for specific types of support messages, thereby providing a metric or multiple metrics related to user satisfaction and/or dissatisfaction. As can be appreciated, such escalations of the support messages may signal that the user 116, for example, is not satisfied with the assistance provided by the representative 126 (and, in some cases, may reflect poorly on the representative 126, the payment service provider 106, etc.). Often, once the support message is escalated, it is then prioritized and addressed/resolved immediately and/or by another representative.

Figure 2:
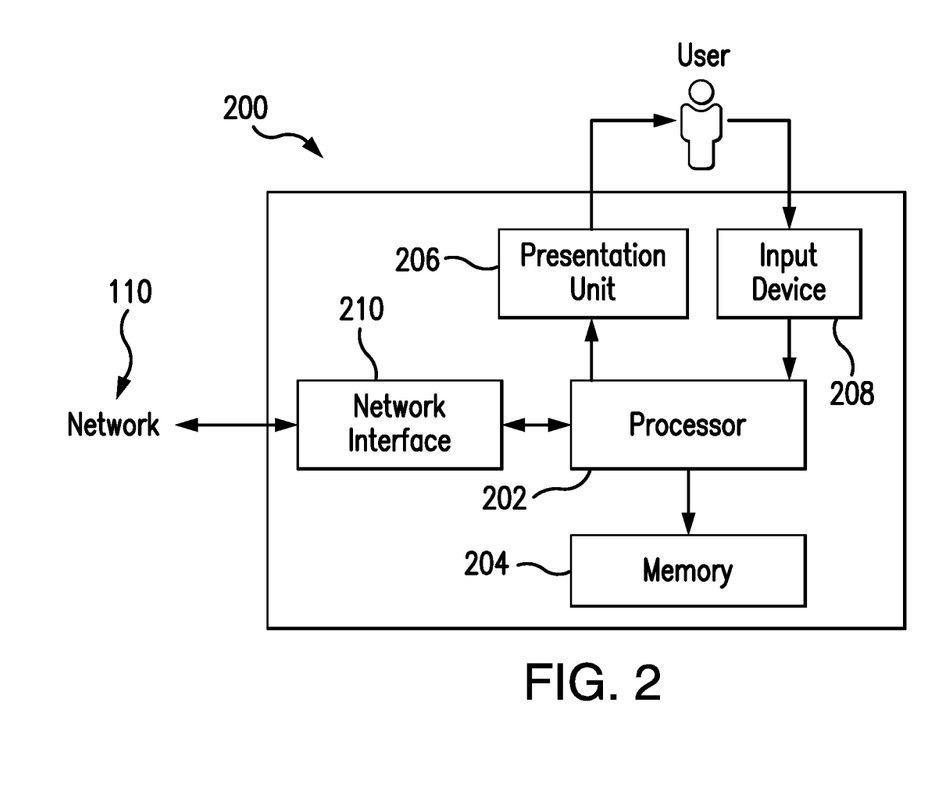
FIG. 2 is a block diagram of an exemplary computing device that may be used in the payment system of FIG. 1.

FIG. 2 illustrates an exemplary computing device 200 that can be used in the payment system 100. Further to the above, the computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the computing devices 122, 124, and 130 may be considered a computing device consistent with computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein. In connection therewith, the computing device 200 is generally programmable to perform one or more operations described herein by programming the memory 204 and/or the processor 202.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, support messages, indications of support messages that have been escalated, escalation scores, regression models, classes of users/entities, predefined lists of words, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., transaction information, support messages, escalation scores for support messages, etc.), visually, for example, to a user of the computing device 200, such as the consumer 112 in the system 100, one or more of the users 114-120, the representative 126, etc. And, various interfaces (e.g., as defined by web-based applications, as defined by websites, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from the user (i.e., user inputs) such as, for example, inputs by the consumer 112 on his/her computing device 122, inputs by the users 114-120 at their respective computing devices 124, inputs by the representative 126 at his/her computing device 130, etc., as part of compiling and transmitting support messages, or as part of responding to support messages, etc. The input device 208 may include a single input device or multiple input devices. The input device 208 is coupled to (and is in communication with) the processor 202 and may include, for example, one or more of a keyboard, a pointing device, a mouse, a stylus, a barcode scanner, a QR code scanner, a touch sensitive panel (e.g., a touch pad or a touch screen, etc.), another computing device, and/or an audio input device, etc. Further, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the payment service provider 106 in the payment system 100 includes a support engine 128, which is configured, by executable instructions, to operate as described herein. The support engine 128 may include and/or may be implemented in a computing device consistent with computing device 200, and such computing device may include a single computing device or may be multiple computing devices located together and/or distributed across a geographic region. Regardless, when support messages are submitted from the consumer 112 and/or the users 114-120 to the representative 126, each is generally directed to the support engine 128 and, as such, the support engine 128 is configured to receive the support messages and to queue the support messages (in a data structure, for example) for review and/or action by support personnel at the payment service provider 106 (e.g., by the representative 126, etc.).

In general in the payment system 100, historical data relating to previously received/addressed support messages, and their escalation status (e.g., whether the prior support messages where escalated or not, etc.), is used to initially train the support engine 128 for subsequent use in evaluating the received/queued support messages. In connection therewith, the support engine 128 is configured to generate one or more machine learning classification algorithms (broadly, machine learning models) (e.g., binary classifiers, logistic regressions, etc.) based on the historical data, as appreciated by those skilled in the art in view of the disclosure herein. The machine learning models represent patterns in the historical data to provide an ability to predict escalation of the support messages based on the factors/variables upon which the models are learned.

Prior to generating the model(s), the support engine 128 is configured to normalize the support message through application of one or more cleaning techniques and/or standardization techniques. An exemplary cleaning technique may include, without limitation, scrubbing (e.g., removing, etc.) system-generated symbols, signatures, links/URLs, email addresses, alpha-numeric characters, numbers, words that are two characters or less in length, and/or unnecessary spaces, etc. Additional cleaning techniques, employed by the support engine 128, upon receipt of the support message, or later, may include, without limitation, combining subject and body text, text stemming (e.g. reducing the terms run, ran, running, and other variations thereof to the same term (such as run) and then counting each of the terms (in techniques where terms are counted, etc.) as the same term; etc.), text tokenization, elimination of stop words (e.g., eliminating words such as 'and,' 'but,' 'is,' 'would,' and 'like,' or other words in a predefined stop list (e.g., predefined words that are of minimal value to determining whether a support message will be escalated or not are removed from the combined text, etc.); etc.), etc. And, exemplary standardization techniques may include, without limitation, converting all upper-case letters to lower-case, or vice-versa, etc. It should be appreciated that such normalization operations are also performed on the historical data in connection with training the support engine 128.

Then, once the support message is normalized, the support engine 128 is configured to generate the model(s) for the historical support message generally as defined by a combination of a temporal factor for the message (e.g., a time variable, etc.), a source factor for the message (e.g., a company variable, etc.), and a text content factor (e.g., a text-based variable, etc.) for the message (as described in more detail hereinafter). It should be appreciated that these three factors, and/or more or fewer or other factors, may be used in generating and/or training the model(s) herein, based on the historical support message data.

Initially, the temporal factor for the support message may include (or may be based on), for example, a duration between when the support message is received/created by the support engine 128 and when the escalation score for the support message is generated (or up to a current time, or up to a time when the issue raised in the support message is resolved, or up to another time). Or, the temporal factor may include a duration between when a ticket is created for the support message (e.g., by the support engine 128, etc.) and when the escalation score for the support message is generated (or up to a current time, or up to a time when the issue raised in the support message is resolved, or up to another time). In this exemplary embodiment, however, in training the support engine 128, the support engine 128 is configured to determine the temporal factor by taking a difference between a creation time for a given support message and a resolution time for the given support message (e.g., in hours, etc.). Next, the support engine 128 is configured to determine a logarithm of this value, thus providing the temporal factor in the machine learning models (e.g., a coefficient for the temporal factor for use in the machine learning models, etc.).

Next, although the factors need not be determined in any particular order, the support engine 128 is configured to determine the source factor (e.g., company score, etc.) as including and/or being based on a source of the support message, such as a name of the entity from which the support message was received (e.g., a name of the merchant 102, a name of the acquirer 104, a name of the payment service provider 106, a name of the issuer 108, etc.), etc. For example, when a support message is received by email from john_smith@bank108.com, the source factor for the associated support message (as used in all subsequent computations) may include bank108, as retrieved from the email. In addition, the source factor may include (or may be based on) a class associated with the entity that submitted the message, where certain classes may be provided priority support, etc. The level of prioritized support may then be the same or different for different classes, and may affect the source factor accordingly. Additionally (or alternatively) in this exemplary embodiment, from the historical data used in training the support engine 128, a data structure can be generated (e.g., by the support engine 128, etc.) representing, for each entity from which a support message was received, which of the prior support messages where escalated and which were not. Once generated (in connection with training the support engine 128), the data structure can then be used in connection with generating escalation scores for newly received support messages (as described in more detail hereinafter). Table 1 illustrates such an exemplary data structure, based on exemplary prior support messages received from three entities: bank108, bank230, and bank 231. In the example of Table 1, bank108 includes a source factor (or coefficient therefor) of 0.025; bank110 includes a source factor (or coefficient therefor) of 0.043; and bank231 includes a source factor (or coefficient therefor) of 0.

TABLE 1

| Company Name | Total Number of Support Messages In Training Data (A) | Number of Escalated Support Messages In Training Data (B) | Company Score/Source Factor (A/B) |
|---|---|---|---|
| Bank 108 | 200 | 5 | 0.025 |
| Bank 230 | 23 | 1 | 0.043 |
| Bank 231 | 49 | 0 | 0 |

And, the text content factor for the support message may include (or may be indicative of), for example, a representation of the text content of the subject and the body of the support message, whether by all terms, certain terms, frequency of terms, count of terms (e.g., the number of words, the number of numbers, etc.), etc. As such, the text content factor may include, for example, a score vector representing the words/terms in the support message (as determined after the support message is normalized as described above), etc. With that said, the text content factor may be computed by developing a classification algorithm (e.g., a support-vector machine, a random-forest, a logistic regression, a binary classifier, etc.), for use in classifying the normalized support message. In one example, the support engine 128 is configured to generate a matrix for each of the historical support messages, with each term being in one column and an additional column for each support message in the set of historical support messages, in which a count (or, potentially, a frequency (e.g., a term frequency-inverse document frequency (TF-IDF), etc.), etc.) for the term is included. The support messages (and/or the matrix) are further designated with another variable (e.g., a y-vector, etc.), which is an indication of whether the support message was escalated or not including, for example, 0 for not escalated and 1 for escalated. Then, the support engine 128 is configured to run a logistic regression, in this example, where the X variable is the matrix, and the Y variable is the escalation vector (e.g., 0 or 1) for the given support message. The regression yields a coefficient for each of the terms, or at least some of the terms, in the matrix, denoting how much the term related to escalation. For example, the term "urgent" may yield a coefficient 0.6, while the term "thank" may yield a coefficient 0.00001. The support engine 128 then stores the coefficients and corresponding terms, from the logistic regression, in memory 204 for use by the support engine 128 in connection with generating the text content factor (e.g., for a newly received support message, the support engine 128 may be configured to generate the text content factor by multiplying the predetermined coefficient for each term in the support message by the frequency (or count, etc.) of the corresponding term in the newly received support message, and sum the results for all terms in the new received support message; etc.).

In various other embodiments, in constructing the machine learning model(s) herein, the support engine 128 may be configured to account for different and/or additional factors (in addition to, or in place of, the three factors described above) in generating the escalation score for the support message. Table 2 illustrates a number of such different and/or additional factors.

TABLE 2

| Factors |
|---|
| Attachment Factor (e.g., whether the support message includes an attachment, etc.) |
| Number Factor (e.g., a number of words in a subject and/or body of the support message, a number of numbers in the support message, etc.) |
| First Segment Factor relating to the subject of the support message (e.g., does the subject include a "re" or a "fwd," etc.) |
| Communications Factor (e.g., a number of communications since receipt of the support message, etc.) |
| Unique Word Factor (e.g., relating to use of unique words in the support message, etc.) |
| Representative Factor (e.g., relating to the representative to which the support message is assigned, etc.) |
| Group Factor (e.g., relating to a group to which the support message is assigned, etc.) |
| Product Factor (e.g., relating to a product identified in the support message, etc.) |
| Issue Factor (e.g., relating to a type of issue in the support message, etc.) |

Once the temporal factor, source factor, and text content factor are determined/calculated (e.g., the coefficients for such factors, etc.), as provided above, the support engine 128 is configured to combine the three factors into the machine learning model(s) (e.g., by logistic regression or other binary classifier, etc.). The support engine 128 is configured to then store the model(s) in memory 204, for example, associated therewith.

Then in this exemplary embodiment, upon receiving/queuing the new support messages from the consumer 112 and/or the users 114-120, the support engine 128 is configured to generate an escalation score based on the machine learning model(s) stored in memory 204. The escalation score is generally indicative of a likelihood that the support messages may be escalated for review (e.g., for one or more of the reasons described above, etc.). In particular, the support engine 128 is configured to determine/calculate the temporal factor, source factor, and text content factor for a new support message (consistent with the description above and, for example, using the coefficients generated above) and to determine the escalation score based the three above factors, for example, relative to the machine learning model(s). Further, based on the escalation score, the support engine 128 is configured to identify a likelihood of escalation of the support message and to transmit the escalation score for the support message, based on one or more thresholds, to the representative 126. Or, the support engine 128 may be configured to alternatively (or additionally) identify the support message and transmit the corresponding escalation score to the representative 126 based on the escalation score relative to escalation scores for other messages, for example, in a prioritized listing of support messages, or to permit the representative 126 to prioritize the support messages as desired.

In addition, in various implementations of the payment system 100, the support engine 128 may be configured to also regenerate the escalation score for the support message at one or more intervals, to identify the support message relative to other support messages based on the further re-score of the support message (e.g., to account for changes in the factors for the support message, to account for a change in relation of the support message to other support messages, etc.). For example, the support engine 128 may be configured to regenerate the escalation score for the support message at the one or more intervals until the support message is resolved and closed by the representative 126. In so doing, the text content factor and the source factor associated with the support message may not change, but the temporal factor will change. And, as the difference between the time when the support message is created and the time the escalation score for the support message is regenerated increases, the likelihood of the support message being escalated naturally increases (as captured by the re-scoring operation).

When the escalation score for the support message is regenerated, it should be appreciated that, for example, after an initial score is generated, additional factors may then be considered for the support message in regenerating the escalation score. For example, an internal priority may be assigned to the support message after generating an initial score, and then the internal priority is accounted for in regenerating the escalation score for the support message. Further, in various embodiments, the support engine 128 may be configured to employ and/or modify the factors upon which the escalation scores are generated, over time, to improve accuracy of the scores and/or to improve the indication by the scores of a likelihood of the support messages to be escalated.

Figure 3:
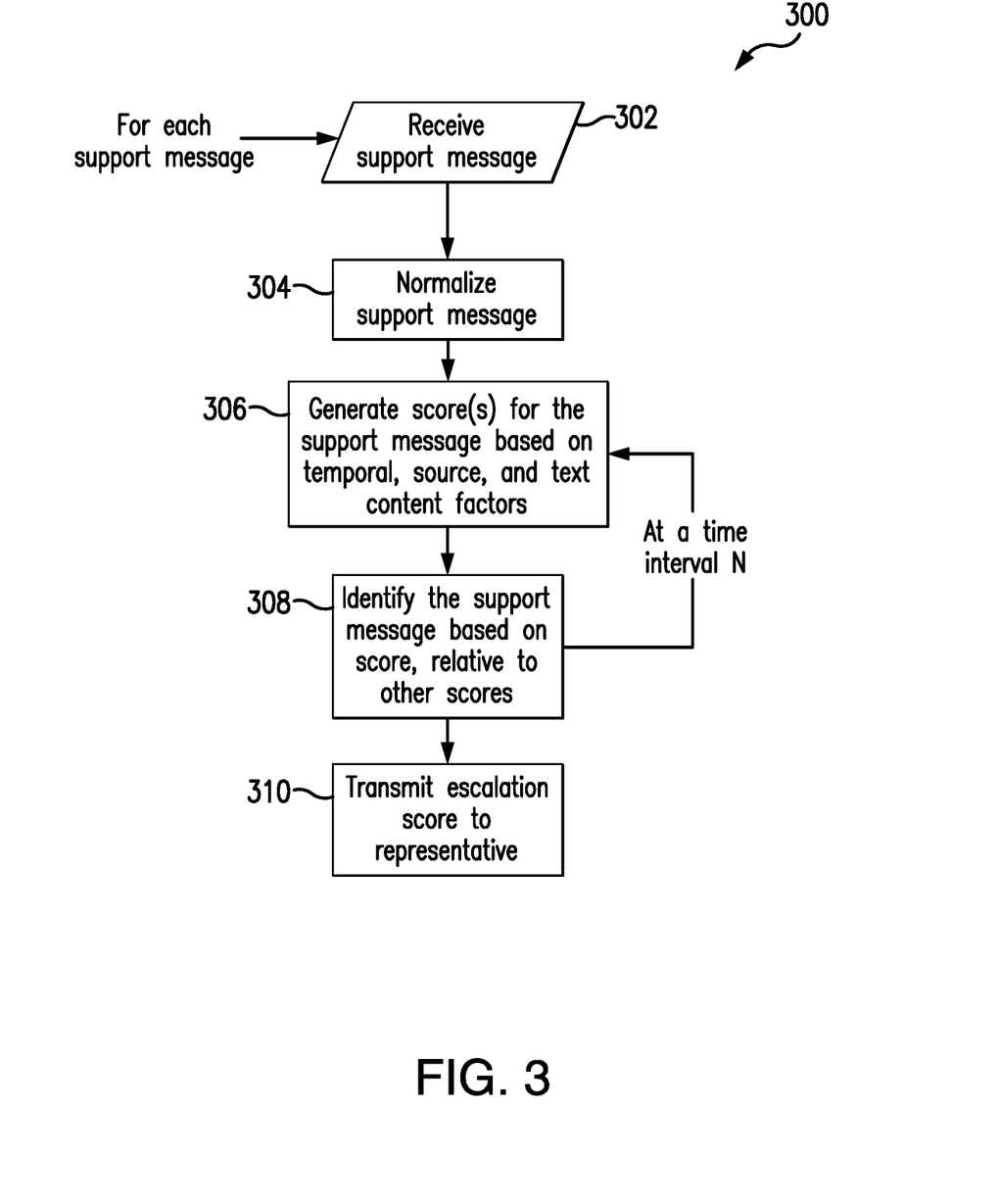
FIG. 3 is a flowchart of an exemplary method for processing a support message as part of a request for support received from a user, which can be implemented via the payment system of FIG. 1.

FIG. 3 illustrates an exemplary method 300 for processing a support message received from a user. The exemplary method 300 is described as implemented in the system 100, and with reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300. In addition, it should be appreciated that method 300 represents only one exemplary group of operations for processing a support message, and that other methods may include other groups of operations as desired.

Initially in the method 300, the support engine 128 receives a support message from a user, at 302. As described for the payment system 100, and with reference to FIG. 1, the support message may be received from any number of users in the payment system 100 and may relate to, for example, services and/or applications provided by (and/or supported by) the payment service provider 106, etc. In particular, the support message may be received from any one of the consumer 112 or the users 114-120 in the system 100. For example, the consumer 112 (broadly, a user) may have an issue with his/her virtual wallet application, and in connection therewith submit, via the computing device 122, a support message for the issue. Similarly, the issuer 108, and more specifically the user 120 associated therewith, may have an issue related to settlement of a specific payment account transaction, and in connection therewith may create and send, from the computing device 124, a support message for the issue.

Figure 4:
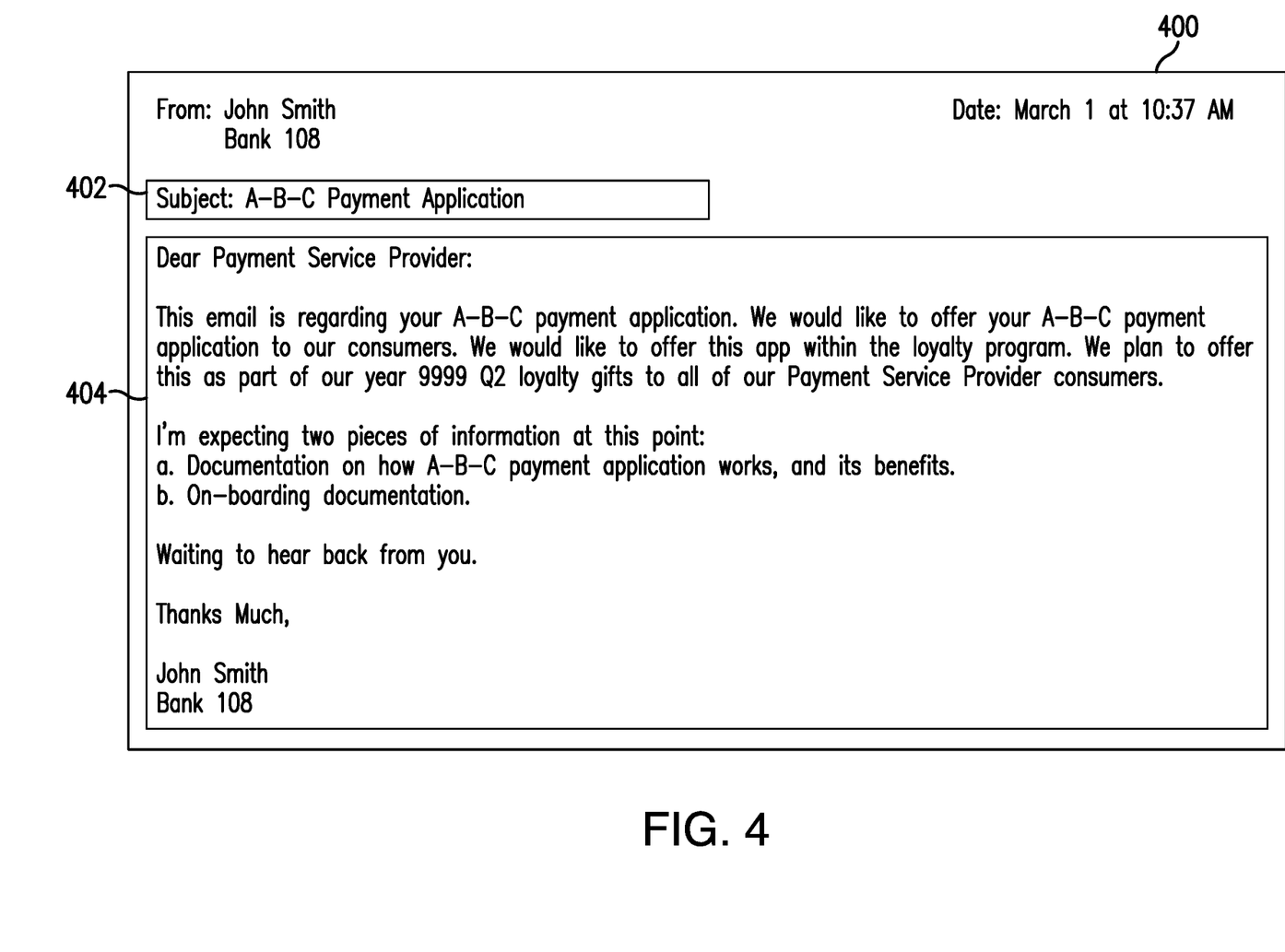
FIG. 4 illustrates an exemplary support message that may be sent/received in connection with the exemplary payment system of FIG. 1 and/or the exemplary method of FIG. 3.

FIG. 4 illustrates an exemplary support message 400 that may be received by the support engine 128 from the user 120 (associated with the issuer 108). As shown, the support message 400 was received on March 1 at 10:37 AM, from the user 120 (i.e., from John Smith) who is associated with the issuer 108 (i.e., "Bank 108"). And, the support message 400 includes text divided into a subject portion 402 and a body portion 404. In this particular example, John Smith is inquiring with the Payment Service Provider about their A-B-C payment application, and requesting additional information therefor.

Next in the method 300, the support engine 128 normalizes the support message, at 304. For example, the support engine 128 may employ any of the cleaning and/or standardization techniques listed above, at one normalizing time, at 304, and potentially later in the method 300 (e.g., at another later normalizing time, etc.), as the support message is used to determine the factors and/or the model (e.g., as the support message is used to determine a text content factor, etc.) for the basis of ultimately generating an escalation score for the support message, as described more below. The normalizing time may include a difference between a time at which the support message was created and a time at which such normalization occurs (e.g., in hours, etc.). Regarding the exemplary support message 400 in FIG. 4, if the support message is normalized on March 2 at 9:00 AM, the normalizing time may include 22.38 hours. And, the resulting normalized text from the support message 400 may include the following:

abc payment application dear email regarding abc payment application offer abc payment application consumers offer app loyalty program plan offer part loyalty gifts consumers expecting two pieces information point documentation abc payment application works benefits onboarding documentation waiting hear john smith bank Once the support message is normalized, the support engine 128 generates an escalation score for the support message, at 306. In the illustrated embodiment, and as described in connection with the system 100, and the machine learning model(s) compiled thereby, the escalation score is based on the temporal factor for the support message, the source factor for the support message, and the text content factor for the support message. However, additional and/or other factors may be used in other embodiments.

In particular, for the received support message, the support engine 128 may determine a temporal factor, such as, for example, a duration between receipt of the support message (e.g., March 1 at 10:37 AM for the support message 400 of FIG. 4; etc.) and a current time, and then determine the logarithm (e.g., the natural log, the common log, etc.) of the duration, etc. (e.g., log(22.38)=1.35; etc.). Further, the support engine 128 may determine a source factor, for example, based on the name of the entity submitting the support message (e.g., Bank 108 in the support message 400 of FIG. 4, etc.), etc. and including, in some embodiments, a probability related to the entity, as illustrated above in Table 1 (e.g., regarding the support message 400 of FIG. 4, the source factor may include a number of historical escalations for Bank 108 divided by the total number of historical support messages received for Bank 108 and/or from John Smith, such as 0.025 from Table 1; etc.).

In addition, the support engine 128 may determine a text content factor for the received support message. In particular, after subjecting the support message to normalization, at 304, the support engine 128 may initially generate a term-document matrix, for example, as shown below in Table 3 for the support message 400 of FIG. 4, in which each term in the support message includes an entry along with a count for the term. The term-document matrix may then be used in connection with generating the text content factor for the received support message.

TABLE 3

| Support Message | abc | dear | email | regarding | offer | consumers | loyalty | application | ... |
|---|---|---|---|---|---|---|---|---|---|
| SM-1 | 4 | 1 | 1 | 1 | 3 | 2 | 2 | 2 | ... |

As an example of determining the text content factor for the received message, using the term-document matrix for the received support message, the support engine 128 may use a binary classifier to classify the message between escalated or not escalated. In particular, for example, each term in the matrix for the received support message may be treated as an input to the binary classifier (e.g., as a variable or feature of the binary classifier for the text content factor, etc.). In connection therewith, the binary classifier initially learns patterns from the historical support messages, for example, the presence or absence of what term(s) is/are leading to escalation of the messages, or not (based on the combination of the given term-document matrix for the historical messages and whether or not the particular messages were escalated). The output from the binary classifier, in this example, as applied to the term-document matrix for the new received support message is then used as the text content factor for the newly received support message.

As another example of determining the text content factor for the received message, for each term in the term-document matrix, the support engine 128 may multiply the predetermined coefficient for the term (as determined in connection with training the support engine 128 using the historical support messages, as described above in connection with the system 100) by the count in the matrix, and then combine the results for all terms in the matrix (and potentially normalize the resulting combination to a common scale (e.g., 0 to 1, etc.)). The resulting combination then represents the text content factor for the received support message. For instance, regarding the support message 400, the terms "abc," "dear," "email," and "regarding" may have coefficients of 0.1, 0.001, 0.001, and 0.005, respectively, as determined from the historical support messages in connection with training the support engine 128. The text content factor for the support message 400 may then be determined by initially combining (Z), for each of the terms in the term-document matrix for the support message 400, a product of the corresponding coefficient and the number of occurrences of the term in the normalized message (e.g., Z=A+(0.1×4)+(0.001×1)+(0.001×1)+(0.005×1) . . . , where A is a constant value/intercept applied to all data points as determined in connection with the logistic regression described above in the system 100; etc.) and then, in this exemplary embodiment, calculating the text content factor as, for example, $e^Z/(1+e^Z)$.

As still another example of determining the text content factor for the received message, the support engine 128 may initially determine a TF-IDF for each term in the term-document matrix (thereby generating a TF-IDF matrix score vector). Then, for each term, the support engine 128 may multiply the TF-IDF by the predetermined coefficient for the term (as determined in connection with training the support engine 128 using the historical support messages, as described above in connection with the system 100) and combine (e.g., sum, etc.) the results for all of the terms in the matrix to determine the text content factor for the received support message. For instance, regarding the support message 400, the normalized message includes forty-two (42) total terms. As such, the term frequency (TF) for each of the terms in the term-document matrix of Table 3 is determined by dividing the number of occurrences for the given term by the total number of terms in the normalized message (e.g., for the term "abc," TF=4/42=0.095; etc.). The inverse document frequency (IDF) for each of the terms in the term-document matrix of Table 3 is next determined/retrieved by the support engine 128, based on the training of the support engine 128 using the historical support messages, where the IDF for each of the terms in the term-document matrix of Table 3 is determined by calculating the logarithm (e.g., the common log, etc.) of the total number of historical support messages from the training data set for the support engine 128 divided by the number of the total historical support messages in which the particular term at issue occurs (e.g., assuming the training data set included 1,000 support messages and the term "abc" occurred in 300 of the messages, the IDF for the term "abc" may be calculated as: IDF=log (1000/300)=0.523; etc.). A TF-IDF matrix score vector for the support message 400 then includes a product of TF and IDF for each term (e.g., for the term "abc," TF-IDF=0.095× 0.523=0.050; etc.). The text content factor for the support message 400 may then be determined by initially combining (Z), for all of the terms in the term-document matrix for the support message 400, a product of the corresponding coefficient for the given term and the TF-IDF value for the given term (e.g., Z=A+(0.1×0.050)+ . . . , where A is again a constant value/intercept applied to all data points as determined in connection with the logistic regression, or other binary classifier, described above in the system 100; etc.) and then calculating the text content factor as $e^Z/(1+e^Z)$ or, potentially, through other suitable algorithms.

Then, once each of the temporal factor, the source factor, and the text content factor is determined for the support message, the support engine 128 determines the escalation score, at 306, based on values for each of the three factors and based on/using the machine learning model(s) generated above for the historical support messages (as described in connection with the system 100, for example, via the logistic regression or other binary classifier identified in training the support engine 128, etc.).

Next, the support engine 128 identifies, at 308, a likelihood of the support message being escalated based on the escalation score. This may include comparing the escalation score for the support message to a threshold. For example, the support engine 128 may determine whether support messages are likely to be escalated or not by comparing their escalation scores to a threshold of 0.5, where support messages with scores greater than or equal to the 0.5 threshold are likely to be escalated and denoted as 1 (with other support messages with scores less than the 0.5 threshold not being likely to be escalated and denotes as 0). The particular threshold may be based on the manner in which the escalation score is generated, a scale of scores generated, and/or a precision with which the support engine 128 is expected to predict such escalation, as will be appreciated by those skilled in the art. Alternatively, identifying a likelihood of the support message being escalated may include comparing the escalation score for the support message to escalation scores for other support messages. In any case, when the support message is indicated to be escalated, it will be identified as such, and the escalation score will be transmitted, either alone, or with the support message, or with reference to the support message, to the representative 126, at 310. In one example, the support message may be listed on an interface viewable by the representative 126 (at the computing device 200, etc.) and is ordered in the interface (along with other support messages) in accordance with its escalation score (relative to the escalation scores or the other messages), and/or is otherwise visually distinguished from other support messages in the interface, again, in accordance with the relative corresponding escalation scores for the messages.

Further in the method 300, after one or more intervals, the support engine 128 may return to 306 and again generate a score for the support message, thereby accounting for a change in at least the temporal factor for the support message. The interval may include, without limitation, 30 minutes, an hour, two hours, five hours, a day, or some other time interval, which is less than, greater than or any increment between the listed example intervals. Then, once the further score is generated, the support engine 128 again identifies the support message to the representative 126 based on the score as described above, for example, as predicted to be escalated, or not escalated, for heightened review. This may be continued until the support message is addressed and/or resolved.

In view of the above, the payment service providers, systems and methods of the present disclosure provide various advantages in connection with processing support messages to payment service providers. In this manner, a support engine may be employed to provide one or more models, which may be executed when a new support message is received, with little or no manual manipulation and/or attention given to the support message. The one or more thresholds employed, as basis for interpreting an escalation score, herein, for use in determining whether to identify or not identify a support message as likely to be escalated may be defined and/or modified to preferences and/or professional skills of the involved support personnel (or others). Moreover, the systems and methods herein may further provide improvement to user satisfaction, by improving efficiency of the manner in which support messages are processed to avoid, in some instances, or reduce the escalation of support message by directing support personnel attention to those message that would-be escalated support messages, prior to their escalation.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, from a user, a support message related to a payment service provider, (b) generating an escalation score for the support message based on a temporal factor associated with a duration associated with the support message, a source factor for the support message, and a text content factor of the support message, (c) identifying a likelihood of escalation of the support message, whereby a support representative assigned to the support message is able to prioritize the support message over at least one other support message based on the likelihood of escalation for the support message; (d) comparing the escalation score to at least one threshold; and/or (e) transmitting the escalation score and/or the support message to the support representative assigned to the support message.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of processing a support message, from a user, for support relating to one or more services associated with a payment system, the method comprising:

normalizing a plurality of historical support messages received by a payment service provider;

for each of the plurality of normalized historical support messages, generating a term frequency-inverse document frequency (tf-idf) matrix based on a normalized text of the historical support message, the tf-idf matrix indicative of coefficients for terms of the normalized text of said historical support message;

training a machine learning escalation score model using a plurality of variables, the variables including, for each of the plurality of historical support messages, whether the historical support message was escalated from a first level of review to a heightened level of review relative to the first level of review, a creation time for the historical support message, a resolution time for the historical support message, a source of the historical support message, and the tf-idf matrix for the historical support message;

storing the trained machine learning escalation score model in a memory;

receiving, from a user, at a computing device in communication with the memory, a new support message related to a payment service provider;

normalizing, by the computing device, the new support message;

generating a tf-idf for each term included in the normalized new support message, based on a term frequency and an inverse document frequency for each term included in the normalized new support message;

based on the normalized new support message, determining, by the computing device:

a temporal factor for a duration associated with the new support message, a source factor for the new support message based on historical support messages relating specifically to the user, and a text content factor for the new support message, the text content factor based on the coefficients indicated by the tf-idf matrices for the plurality of normalized historical support messages and the generated tf-idfs for at least a subset of terms included in the normalized new support message;

based on the temporal factor, the source factor and the text content factor, generating, by the computing device, using the trained machine learning escalation score model, an escalation score specific to the new support message, the escalation score indicative of a likelihood that the new support message will be manually escalated to the heightened level of review;

comparing, by the computing device, the escalation score to at least one threshold; and in response to the escalation score satisfying the at least one threshold, transmitting, by the computing device, the escalation score and/or the new support message to a support representative assigned to the new support message, thereby prioritizing review of the new support message over at least one other support message, based on the likelihood of escalation for the new support message, while limiting manual intervention in determining to prioritize the review of the new support message.

2. The computer-implement method of claim 1, wherein normalizing the new support message includes normalizing the new support message prior to generating the escalation score.

3. The computer-implemented method of claim 2, further comprising:

generating, by the computing device, the temporal factor for the new support message based on a received time of the new support message and a time associated with generating the escalation score for the new support message; and generating, by the computing device, the source factor for the new support message based on a comparison of escalated historical support messages relating specifically to the user to a total of the historical support messages relating specifically to the user.

4. The computer-implemented method of claim 1, wherein the text content factor includes a count for one or more words included in the new support message.

5. The computer-implemented method of claim 1, wherein the duration associated with the new support message is based on a received time of the new support message and a time associated with generating the escalation score for the new support message; and wherein the temporal factor is based on a logarithm of the duration associated with the new support message.

6. The computer-implemented method of claim 1, further comprising generating, by the computing device, a further escalation score for the new support message after a defined interval;

comparing, by the computing device, the further escalation score to the at least one threshold; and when the further escalation score satisfies the at least one threshold, transmitting, by the computing device, the further escalation score and/or the new support message to a support representative assigned to the new support message.

7. The computer-implement method of claim 6, wherein the defined interval includes between about an hour and about a day; and wherein generating the further escalation score is based on at least one additional factor.

8. The computer-implement method of claim 1, wherein generating the escalation score includes generating the escalation score further based on whether the new support message includes an attachment.

9. The computer-implement method of claim 1, wherein generating the escalation score includes generating the escalation score further based on at least one of: a first segment of a subject of the new support message, the support representative assigned to the new support message, and a number of communications associated with the new support message.

\* \* \* \* \*